(12) United States Patent
Koshiishi et al.

(10) Patent No.: US 8,390,175 B2
(45) Date of Patent: Mar. 5, 2013

(54) OPTICAL DEVICE AND OPTICAL APPARATUS

(75) Inventors: Ryo Koshiishi, Kanagawa (JP); Yoshihiro Oshima, Kanagawa (JP); Akira Ono, Kanagawa (JP)

(73) Assignee: Sony Corporation, Tokyo (JP)

( * ) Notice: Subject to any disclaimer, the term of this patent is extended or adjusted under 35 U.S.C. 154(b) by 91 days.

(21) Appl. No.: 12/929,406

(22) Filed: Jan. 21, 2011

(65) Prior Publication Data

US 2011/0205630 A1    Aug. 25, 2011

(30) Foreign Application Priority Data

Feb. 24, 2010  (JP) ................................ 2010-039297

(51) Int. Cl.
*H01L 41/00* (2006.01)
*G02F 1/03* (2006.01)

(52) U.S. Cl. ........ 310/335; 310/311; 310/317; 359/254; 359/290; 359/322; 359/323

(58) Field of Classification Search .......... 359/280–283, 359/245–252, 254–258, 290, 322–323; 310/311, 310/317, 335
See application file for complete search history.

(56) References Cited

U.S. PATENT DOCUMENTS

| | | | |
|---|---|---|---|
| 4,046,455 A * | 9/1977 | Kumada et al. | 359/252 |
| 7,280,145 B2 * | 10/2007 | Takizawa et al. | 348/340 |
| 2009/0186302 A1 | 7/2009 | Furuse et al. | |
| 2009/0212662 A1 * | 8/2009 | Ashizawa | 310/323.03 |

FOREIGN PATENT DOCUMENTS

JP         2003-031922         1/2003

* cited by examiner

*Primary Examiner* — Evelyn A. Lester
(74) *Attorney, Agent, or Firm* — Rader, Fishman & Grauer PLLC (57) ABSTRACT

An optical device includes: an optical device body; a first transparent electrode film deposited on a light incident side; a second transparent electrode film so formed that the first and second transparent electrode films face away from each other; and a first ferroelectric film deposited at least between the first and second transparent electrode films, wherein the first ferroelectric film vibrates in response to a drive voltage applied through the first and second transparent electrode films.

10 Claims, 9 Drawing Sheets

OPTICAL DEVICE AND OPTICAL APPARATUS

BACKGROUND OF THE INVENTION

1. Field of the Invention

The present invention relates to an optical device having a dust removal capability and an optical apparatus using the optical device.

2. Description of the Related Art

Many single lens reflex digital cameras are configured to use interchangeable lenses and hence a half-silvered mirror and other optical devices incorporated in a digital camera are exposed to the atmosphere when the currently attached lens is interchanged with another one. Dust and other dirt in the atmosphere therefore adhere to the surface of the half-silvered mirror. The dust and other dirt having adhered to the half-silvered mirror form shadows in an image and hence disadvantageously cause decrease in image quality.

To address the problem, the following technique has been proposed: A piezoelectric device is disposed along the periphery of an optical device, and an AC voltage is applied to the piezoelectric device so that it vibrates. The optical device thus vibrates and removes dust and other dirt thereon (see JP-A-2003-319222, FIG. 5 and other figures, for example).

SUMMARY OF THE INVENTION

Figure 15:
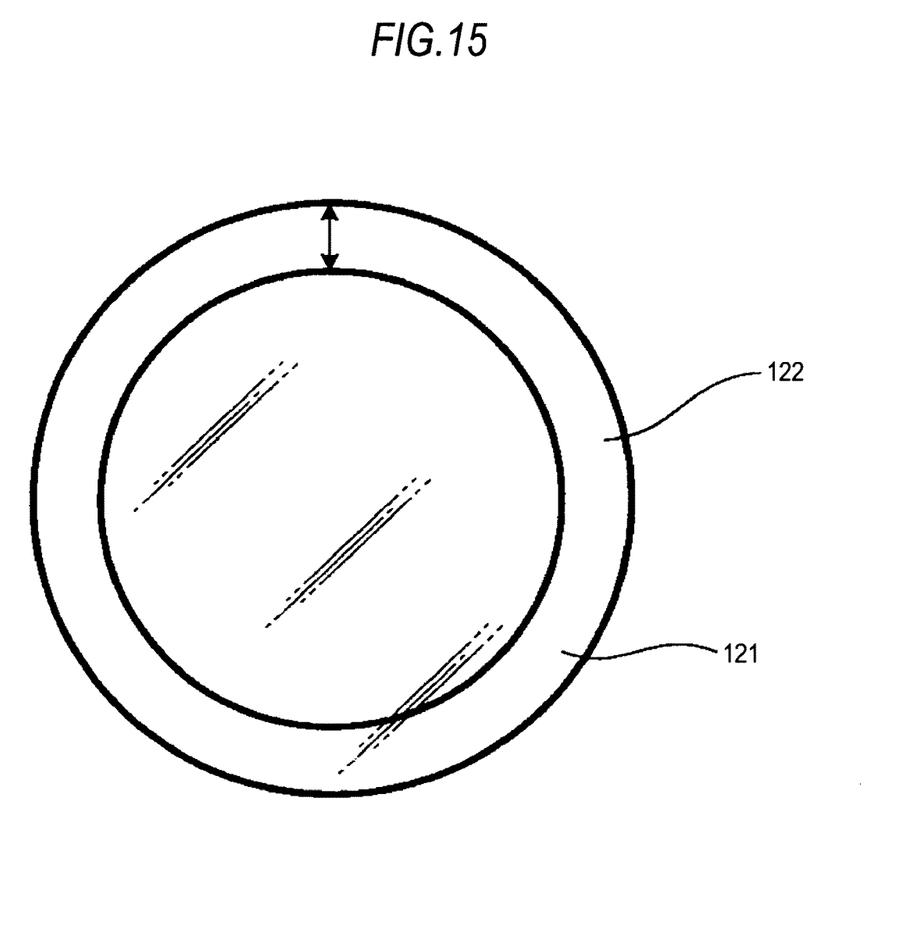
FIG. 15 describes related art.

FIG. 15 is a diagram showing the configuration of an optical device having a dustproofing capability described in JP-A-2003-319222 (corresponding to FIG. 5 in JP-A-2003-319222). The dustproofing capability described in JP-A-2003-319222 (dustproof filter 121) relies on a piezoelectric device 122, which is disposed along the periphery of an optical device, as seen from FIG. 15. When the piezoelectric device 122 is disposed along the periphery of the optical device, the outer dimension of the dustproof filter 121 increases accordingly and hence the outer dimension (peripheral dimension, in particular) of the optical device itself disadvantageously increases due to the piezoelectric device 122.

Thus, it is desirable to provide an optical device capable of removing dust and other dirt without increase in the outer dimension (peripheral dimension, in particular) of the optical device.

An optical device according to an embodiment of the invention includes an optical device body, a first transparent electrode film deposited on a light incident side, a second transparent electrode film so formed that the first and second transparent electrode films face away from each other, and a first ferroelectric film deposited at least between the first and second transparent electrode films, and the first ferroelectric film vibrates in response to a drive voltage applied through the first and second transparent electrode films.

An optical apparatus according to another embodiment of the invention includes an optical device body, a first transparent electrode film deposited on a light incident side, a second transparent electrode film so formed that the first and second transparent electrode films face away from each other, a first ferroelectric film deposited at least between the first and second transparent electrode films, the first ferroelectric film vibrating in response to a drive voltage applied through the first and second transparent electrode films, and a power source that generates the drive voltage.

According to the embodiments of the invention, forming a ferroelectric film in an optical device, disposing a transparent electrode film on both sides of the ferroelectric film, and overlaying the resultant structure on an optical device body allow the optical device to vibrate without increase in the outer dimension (peripheral dimension, in particular) of the optical device.

According to the embodiments of the invention, dust and other dirt can be removed without increase in the outer dimension (peripheral dimension, in particular) of an optical device. An optical apparatus using the optical device therefore does not have an increased outer dimension.

DESCRIPTION OF THE PREFERRED EMBODIMENTS

An exemplary mode for carrying out the invention will be described below with reference to the accompanying drawings. The description will be made in the order of the following items:

1. First Embodiment (a case where an optical device to which the invention is applied is a half-silvered mirror)

2. Second Embodiment (a case where an optical device to which the invention is applied is a lens)

3. Third Embodiment (a case where an optical device to which the invention is applied is a mirror)

4. Fourth Embodiment (a case where an optical device to which the invention is applied is a polarization device)

5. Fifth Embodiment (a case where an optical device to which the invention is applied is an optical filter)

1. <First Embodiment>

In a first embodiment, an optical device to which the invention is applied is a half-silvered mirror, and the half-silvered mirror is used in an imaging apparatus, which is an optical apparatus. In the present embodiment, a single lens reflex digital camera, but of course not limited thereto, is contemplated as the imaging apparatus. In the following description, removing dust and other dirt is called dust removal.

[Configuration of Imaging Apparatus]

Figure 1:
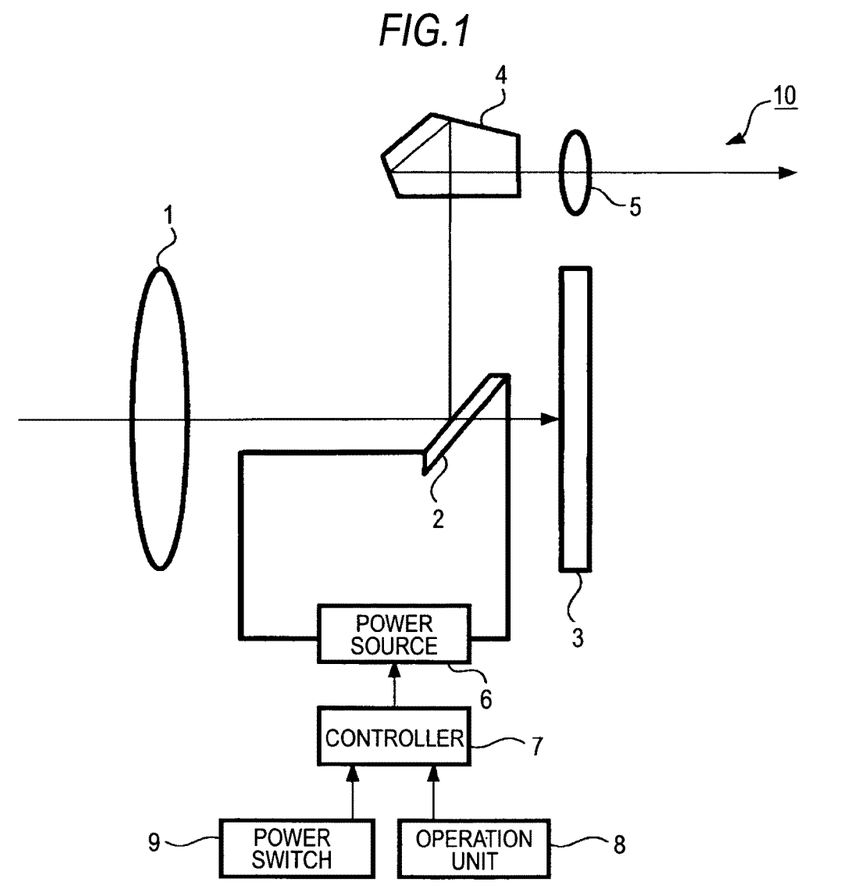
FIG. 1 is a block diagram showing a schematic configuration of an imaging apparatus including a half-silvered mirror according to a first embodiment of the invention.

FIG. 1 is a block diagram showing a schematic configuration of an imaging apparatus including a half-silvered mirror according to the first embodiment of the invention.

In the present embodiment, a single lens reflex digital camera, but not limited thereto, is presented as an example of the imaging apparatus. The present embodiment is, of course, applicable to other imaging apparatus.

As shown in FIG. 1, an imaging apparatus 10 includes a viewing optical system formed of an imaging lens 1, a half-silvered mirror 2, an imaging device 3, a pentaprism 4, and a finder 5. The imaging apparatus 10 further includes a power source 6, a controller 7, an operation unit 8, and a power switch 9.

The half-silvered mirror 2 has a built-in piezoelectric device, and the half-silvered mirror 2 itself vibrates because the piezoelectric device (made of a ferroelectric material) vibrates when the power source 6 applies a drive voltage thereto.

The power source 6 generates the drive voltage applied to the piezoelectric device in the half-silvered mirror 2 so that the half-silvered mirror 2 vibrates.

The controller 7 receives an input signal and produces a control signal for controlling the power source 6 to generate the drive voltage. The controller 7 is, for example, formed of a microcomputer (MPU: Micro Processing Unit) or any other suitable arithmetic operation control unit. The control signal described above may alternatively be produced in accordance with a program recorded, for example, in a ROM (Read Only Memory) or a nonvolatile memory incorporated in the microcomputer.

The operation unit 8, which includes a variety of buttons and keys provided on an enclosure of the imaging apparatus 10, a touch panel laminated to a display screen of the imaging apparatus 10, and other components, produces an input signal and transmits it to the controller 7 via an interface (not shown).

The power switch 9 turns on and off an electric power circuit (not shown) that supplies electric power to the components in the imaging apparatus 10.

FIG. 1 diagrammatically shows only necessary portions to describe the invention. To this end, the illustration of the optical system is simplified, and a signal processing block and other components downstream of the imaging device 3 are omitted.

In the thus configured imaging apparatus 10, when an image of a subject is captured, light passing through the imaging lens 1 is incident on the half-silvered mirror 2. The half-silvered mirror 2, which is a semi-transparent mirror, so divides the incident light that part of the light having passed through the imaging lens 1 is reflected and directed through the pentaprism 4 toward the finder 5 and the remaining light is directed toward the imaging device 3. As a result, the light reflected off the half-silvered mirror 2 allows a photographing user to view the subject at all times. Further, since the remaining divided light is incident on the imaging device 3 at all times, the half-silvered mirror 2 functions as a fixed mirror and provides the photographing user with images through the finder 5 at all times unlike a movable mirror, which provides the photographing user with no images when the shutter is open. Using the half-silvered mirror 2 therefore advantageously enables, for example, continuous image capturing because no period for moving a movable component is necessary.

The timing of dust removal, when it is automatically carried out, is desirably when the power switch 9 is operated. In this case, whenever the imaging apparatus 10 is turned on, dust having adhered to the half-silvered mirror 2 is removed, and an image can be captured with the half-silvered mirror 2 cleaned. A good quality image is thus produced. Alternatively, the user may manually remove dust by operating the operation unit 8 to select a dust removal start icon displayed in a menu screen or pressing a dust removal start button provided on the imaging apparatus 10.

[Configuration of Half-Silvered Mirror]

Figure 2:
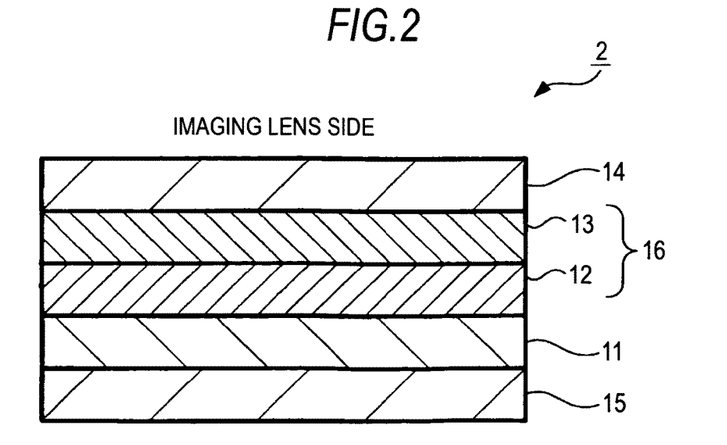
FIG. 2 is a cross-sectional view showing the configuration of the half-silvered mirror according to the first embodiment of the invention.

FIG. 2 is a cross-sectional view showing the configuration of the half-silvered mirror 2.

In this example, the half-silvered mirror 2 is formed by stacking a ferroelectric film 11 (exemplary ferroelectric film), a high refractive index film 12, a low refractive index film 13, and transparent conductive films 14, 15 (exemplary transparent electrode film).

In the half-silvered mirror 2, the ferroelectric film 11 is used as a base. The ferroelectric film 11 is formed by shaping a transparent ferroelectric material into a film. An example of the ferroelectric film 11 is a PVDF (polyvinylidene fluoride) film having a thickness of 50 μm.

The ferroelectric film 11 is not necessarily a film made of PVDF but can alternatively be a film made of PZT (lead zirconate titanate) or PLZT (lead lanthanum zirconium titanate). A film made of any of the materials described above is soft and flexible. Further, the ferroelectric film 11 is desirably thin provided that the thinness does not compromise its ferroelectric characteristics. The reason for this is that the transmittance increases as the thickness decreases, and that the voltage for driving a ferroelectric material decreases as the thickness decreases.

An optical film having the function of a semi-transparent mirror, that is, a half-silvered mirror body 16 (exemplary optical device body), is then deposited on one side of the ferroelectric film 11.

In the present embodiment, for example, an $Nb_2O_5$ (niobium pentoxide) film is deposited as the high refractive index film 12 on the ferroelectric film 11, which is the base, and then an $SiO_2$ (silicon dioxide) film is then deposited as the low refractive index film 13 on the $Nb_2O_5$ film in a sputtering process or any other suitable process.

The high refractive index film 12 is not necessarily made of $Nb_2O_5$ but can alternatively be made of $TiO_2$ (titanium oxide). Further, the optical film is not necessarily a two-layer film made of a high refractive index material and a low refractive index material, but the number of stacked films can be increased. It is expected in this case that the optical characteristics of the optical film are improved.

The transparent conductive films 14 and 15 are next deposited as the transparent electrodes on the other side of the ferroelectric film 11 and one side of the half-silvered mirror body 16, respectively. Each of the transparent conductive films 14 and 15 is, for example, an ITO (indium tin oxide) film having a thickness of 50 nm and deposited in a sputtering process or any other suitable process.

The ITO film is desirably as thin as possible in consideration of its transmittance. Each of the transparent conductive films is not necessarily made of ITO but can alternatively be made of AZO (aluminum-doped zinc oxide), GZO (gallium-doped zinc oxide), IGZO (indium gallium-doped zinc oxide), PEDOT (polyethylene dioxy thiophene), or any other suitable material. Still alternatively, each of the transparent conductive films can be replaced with a thin metal film.

The total film thickness of the half-silvered mirror body 16 (optical film) is desirably 100 nm or smaller. The reason for this is that the transparent conductive films 14 and 15 are deposited as outermost layers so that the electrodes are readily accessed and a large total thickness of the optical film disadvantageously causes the drive voltage to increase.

In the embodiment of the invention, applying a drive voltage at a frequency ranging from several Hz to several thousand Hz from the power source 6 to the transparent conductive films 14 and 15 of the half-silvered mirror 2 having the configuration described above causes the ferroelectric film 11 and hence the half-silvered mirror 2 itself to vibrate, whereby dust having adhered to the surface of the half-silvered mirror 2 is removed.

Figure 3A:
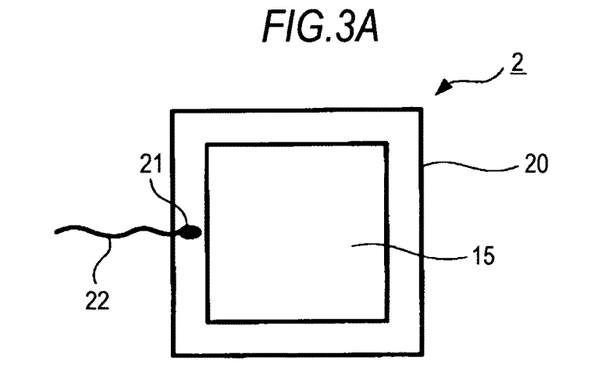
FIGS. 3A and 3B show how the half-silvered mirror according to the first embodiment of the invention is wired, FIG. 3A being a top view of the half-silvered mirror and FIG. 3B being a cross-sectional view of the half-silvered mirror.
Figure 3B:
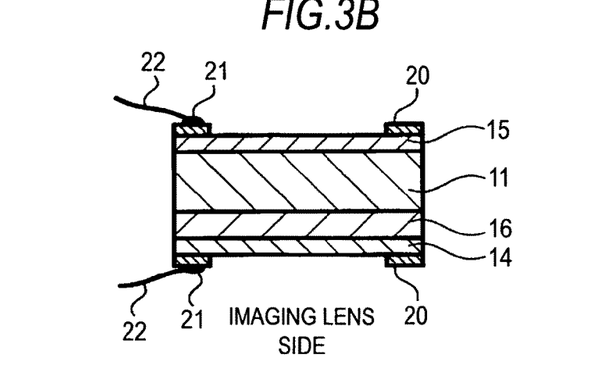

FIGS. 3A and 3B show how the half-silvered mirror 2 is wired. FIG. 3A is a top view of the half-silvered mirror 2, and FIG. 3B is a cross-sectional view of the half-silvered mirror 2. It is noted in FIG. 3B that the lower side faces the imaging lens, unlike FIG. 2.

In the example shown in FIGS. 3A and 3B, a frame 20 to which a wiring line 22 is connected is provided on the surface of each of the transparent conductive films 14 and 15 shown in FIG. 2, and the frame 20 is connected to the wiring line 22 with solder 21. The frames 20 are made of copper or any other highly conductive metal and bonded to the transparent conductive films 14 and 15, respectively, by using a UV curable adhesive or a thermoset adhesive containing conductive fillers.

As shown in FIG. 2 and FIGS. 3A and 3B, the ferroelectric film 11 itself, which is a piezoelectric device, is incorporated in the half-silvered mirror 2 in the present embodiment. It is therefore unnecessary to increase the outer dimension (peripheral dimension, in particular) of the optical device, unlike the portion indicated by the arrow in FIG. 15.

Figure 4A:
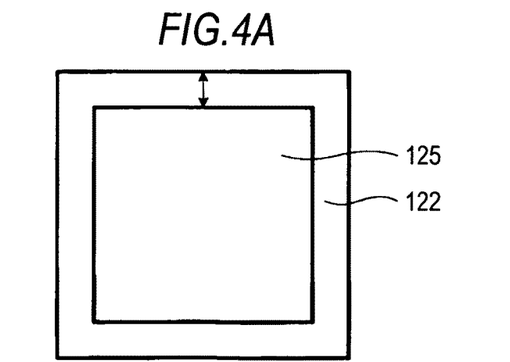
FIGS. 4A and 4B are a top view and a cross-sectional view of a half-silvered mirror of related art;.
Figure 4B:
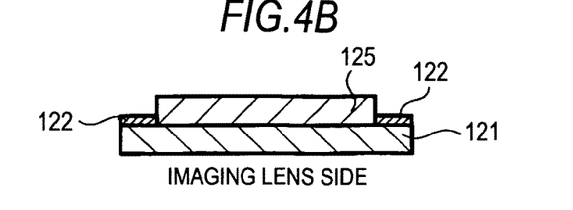

FIGS. 4A and 4B show a half-silvered mirror having the dustproofing capability described in JP-A-2003-319222. FIG. 4A is a top view of the half-silvered mirror, and FIG. 4B is a cross-sectional view of the half-silvered mirror.

In the method described in JP-A-2003-319222, since the piezoelectric device 122 is attached to the periphery of a half-silvered mirror body 125, a frame itself of the piezoelectric device 122 is larger than the half-silvered mirror body 125. Although depending on the type of the piezoelectric device 122, the size of the half-silvered mirror increases by approximately 4 mm when the size of a dustproof filter 121 is increased by approximately 2 mm (the portion indicated by the arrow), which may be greater, in one direction from the optical axis toward the periphery.

In contrast, in the first embodiment of the invention, since the piezoelectric device (ferroelectric film 11) is layered in the half-silvered mirror 2 itself, the outer dimension of the half-silvered mirror 2 does not increase. Further, since the piezoelectric device increases the thickness of the half-silvered mirror 2 only by approximately 10 μm at the maximum even when the thickness of each of the frames 20 is taken into consideration, the size of the enclosure of the imaging apparatus 10 will not virtually increase.

In the example shown in FIGS. 3A and 3B, the frames 20 are placed as the outermost layers of the half-silvered mirror and exposed to the atmosphere. The frames 20 may alternatively be placed not to be exposed to the atmosphere. For example, one of the frames 20 may be disposed between the transparent conductive film 14 and the half-silvered mirror body 16, and the other frame 20 may be disposed between the transparent conductive film 15 and the ferroelectric film 11. Still alternatively, the wiring lines 22 may be soldered directly to the transparent conductive films 14 and 15 instead of using the frames 20.

[Variation 1]

Variation 1 of the half-silvered mirror according to the first embodiment of the invention will be described.

Variation 1 is similar to the half-silvered mirror 2 shown in FIG. 2 but a ferroelectric film and a transparent conductive film are added.

Figure 5:
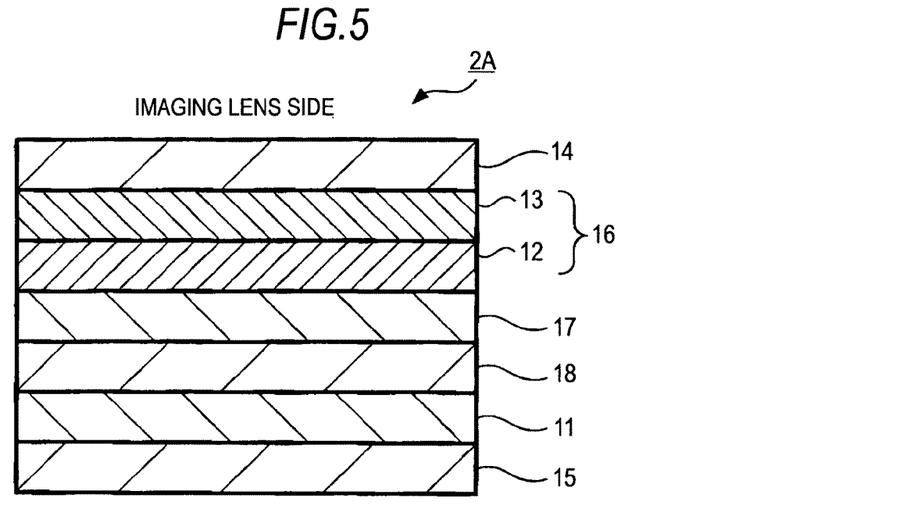
FIG. 5 is a cross-sectional view showing Variation 1 of the half-silvered mirror according to the first embodiment of the invention.

FIG. 5 is a cross-sectional view showing the configuration of a half-silvered mirror according to Variation 1. In FIG. 5, the portions corresponding to those in FIG. 2 have the same reference characters, and no detailed description of these portions will be made.

A half-silvered mirror 2A of the present example is formed by first depositing a transparent conductive film 18 formed, for example, of an ITO film having a thickness of 50 nm as a transparent electrode on one side of a ferroelectric film 11. A ferroelectric film 17 made, for example, of PVDF and having a thickness of 50 μm is then overlaid as another base similar to the ferroelectric film 11 on the transparent conductive film 18. Subsequently, a half-silvered mirror body 16 is deposited on the ferroelectric film 17. Finally, a transparent conductive film 14 is deposited on the half-silvered mirror body 16, and a transparent conductive film 15 is deposited on the other side of the ferroelectric film 11.

As described above, since it is expected in the present example that the drive voltage to be supplied from the power source 6 is reduced by layering the ferroelectric film 17 made of a ferroelectric material, no voltage booster circuit or other components (not shown) are necessary in the power source 6. Further, the number of layered ferroelectric films is two in the present example, whereas it is expected that the drive voltage is further reduced by increasing the number of layered ferroelectric films. In addition to the above advantageous effect, the present example, of course, provides the same advantageous effect as that provided in the example shown in FIG. 2.

[Variation 2]

Variation 2 of the half-silvered mirror according to the first embodiment of the invention will be described.

Variation 2 is similar to the half-silvered mirror 2 shown in FIG. 2 but a plastic film is added as a base.

Figure 6:
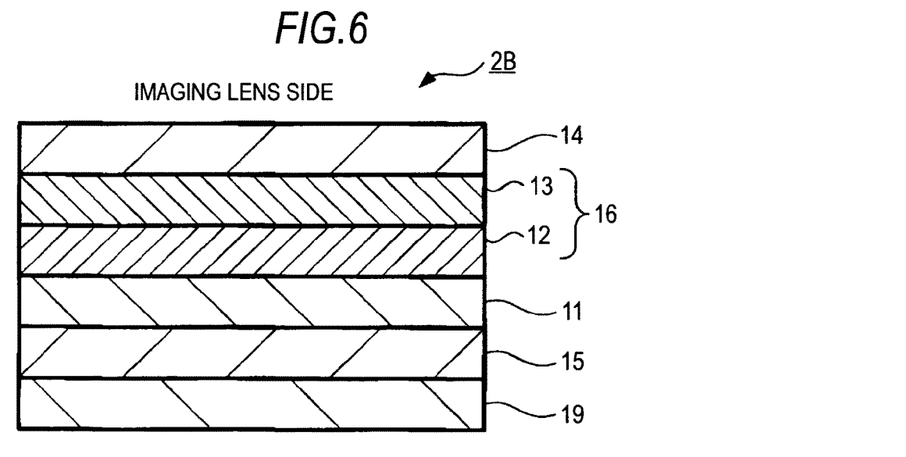
FIG. 6 is a cross-sectional view showing Variation 2 of the half-silvered mirror according to the first embodiment of the invention.

FIG. 6 is a cross-sectional view showing the configuration of a half-silvered mirror according to Variation 2. In FIG. 6, the portions corresponding to those in FIG. 2 have the same reference characters, and no detailed description of these portions will be made.

A half-silvered mirror 2B of the present example includes a transparent, flexible plastic film 19 as a base. The plastic film 19 is, for example, a PET (polyethylene terephthalate) film or a PC (polycarbonate) film having a thickness of 50 μm. A transparent conductive film 15 is overlaid on the plastic film 19. A ferroelectric film 11 is then overlaid on the transparent conductive film 15. Subsequently, a half-silvered mirror body 16 is deposited on the ferroelectric film 11. Finally, a transparent conductive film 14 is deposited on the half-silvered mirror body 16.

In the present example, the strength of the entire half-silvered mirror 2B is advantageously improved by using the plastic film 19 as the base without increase in thickness of the ferroelectric film 11. Increasing the thickness of the ferroelectric film 11 is accompanied by a significant increase in the drive voltage and an increase in the cost of the material, but none of the disadvantages described above occurs in the present example. In addition to the above advantageous effect, the present example, of course, provides the same advantageous effect as that provided in the example shown in FIG. 2.

The present example, in which the film thickness of the entire half-silvered mirror 2B is greater and hence the transmittance thereof is lower than those in the example shown in FIG. 2, should be designed as appropriate in consideration of the balance between the transmittance and the strength.

In the examples shown in FIGS. 2, 5, and 6, the transparent conductive films 14 and 15 sandwich the ferroelectric film 11 but does not sandwich the plastic film 19. The reason for this is to avoid that sandwiching the plastic film 19 between the transparent conductive films 14 and 15 causes the resistance of the resultant structure to increase and hence the drive voltage to be supplied from the power source 6 increases.

[Variation 3]

Variation 3 of the half-silvered mirror according to the first embodiment of the invention will be described.

Variation 3 is similar to the half-silvered mirror 2 shown in FIG. 2 but no half-silvered mirror body 16 is disposed between transparent conductive films 14 and 15.

Figure 7:
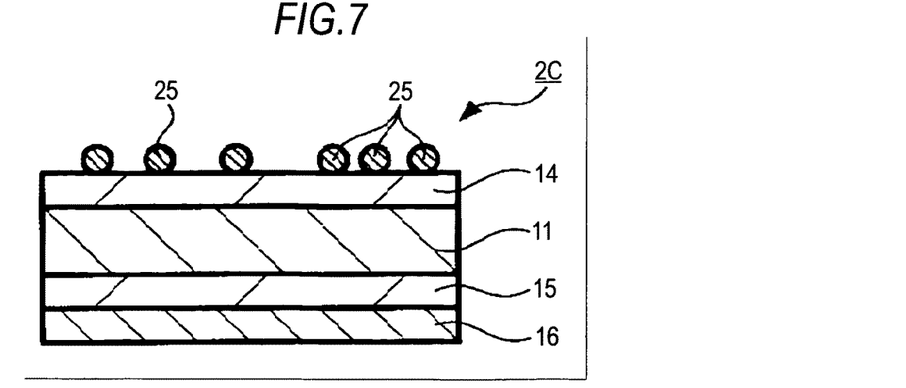
FIG. 7 is a cross-sectional view showing Variation 3 of the half-silvered mirror according to the first embodiment of the invention.

FIG. 7 is a cross-sectional view showing the configuration of a half-silvered mirror according to Variation 3. In FIG. 7, the portions corresponding to those in FIG. 2 have the same reference characters, and no detailed description of these portions will be made.

A half-silvered mirror 2C in the present example is formed by depositing transparent conductive films 14 and 15 on respective sides of a ferroelectric film 11, and a half-silvered mirror body 16 is then deposited on the transparent conductive film 15.

In the present example, directly sandwiching the ferroelectric film 11 between the transparent conductive films 14 and 15 causes the resistance of the resultant structure to decrease and hence the drive voltage to be supplied from the power source 6 decreases, as compared with the case shown in FIG. 2. In addition to the above advantageous effect, the present example, of course, provides the same advantageous effect as that provided in the example shown in FIG. 2.

[Dust Removal Effect]

[Experiment 1]

A description will next be made of a result of an experiment on the effect of the frequency on the dust removal provided by the embodiment of the invention. The experiment was conducted by using the half-silvered mirror 2C having the configuration shown in FIG. 7 as way of example.

Figure 8:
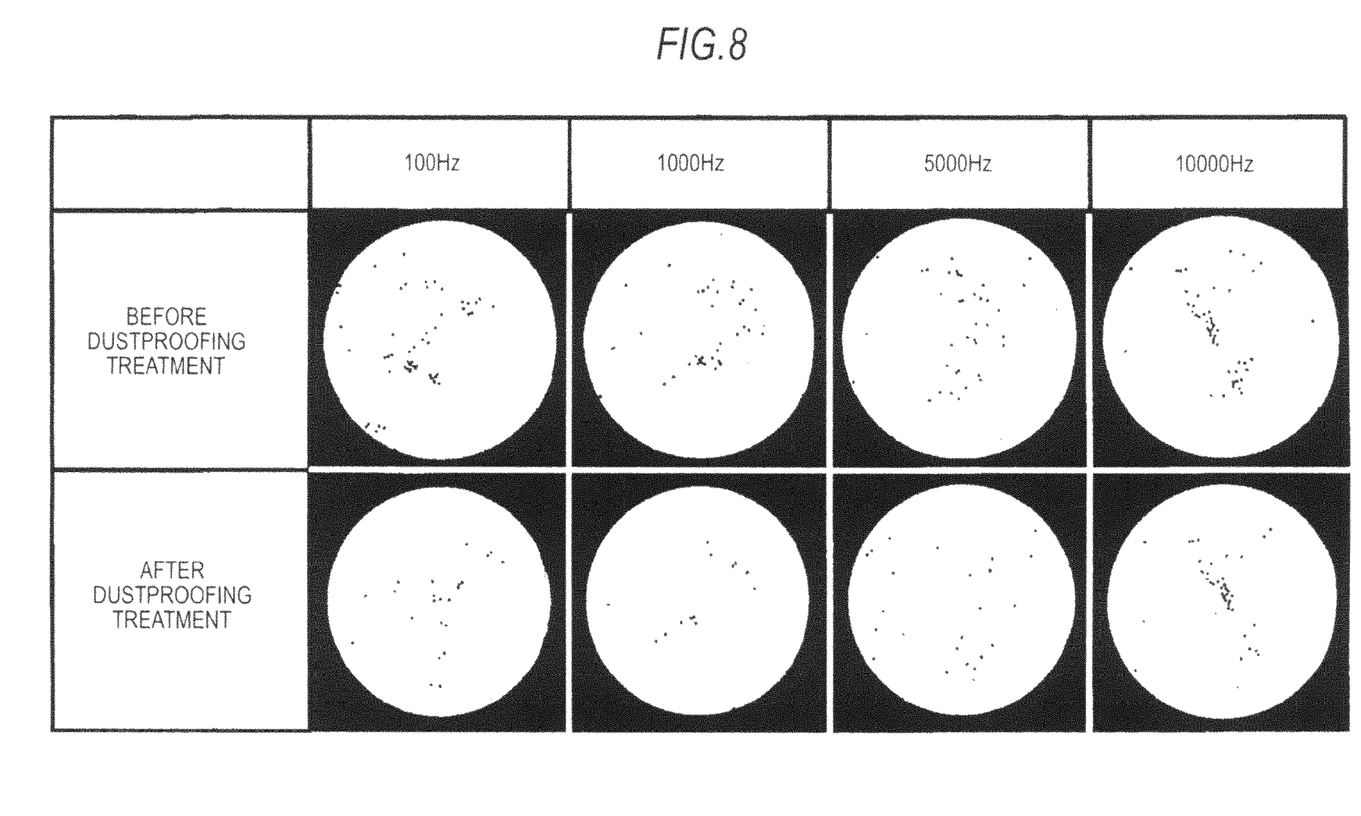
FIG. 8 shows dust having adhered to the surface of the half-silvered mirror shown in FIG. 7 before and after dustproofing treatment.
Figure 9:
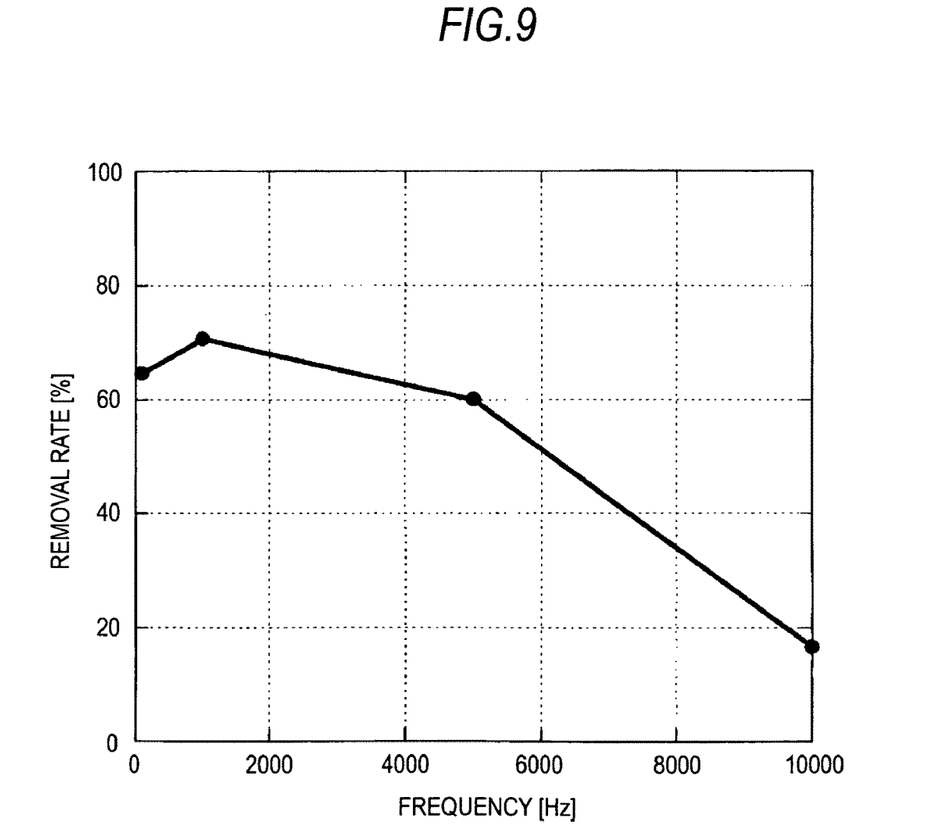
FIG. 9 is a graph representing the relationship between the applied voltage frequency and the rate of dust removal.

FIG. 8 shows how much the surface of the half-silvered mirror 2C is contaminated when solder balls 25 having adhered to the surface of the half-silvered mirror underwent the dust removal. FIG. 9 is a graph representing the relationship between the applied voltage frequency and the rate of dust removal.

The half-silvered mirror 2C used in the experiment was formed by depositing, for example, a PEDOT film having a thickness of approximately 200 nm as the transparent conductive films 14 and 15 on both sides of the ferroelectric film 11, for example, a PVDF film having a thickness of 20 μm. The half-silvered mirror body 16, for example, a layered film made of $SiO_2$ and $Nb_2O_5$, was then deposited.

First, several tens of solder balls 25, each of which had a diameter of 100 μm, were placed over the surface of the half-silvered mirror 2C. After the half-silvered mirror 2C was inclined to the floor by 90 degrees (vertically) for 10 seconds, the surface described above before a drive voltage was applied was photographed under an optical microscope (upper portion in FIG. 8). Similarly, several tens of solder balls 25, each of which had a diameter of 100 μm, were placed over the surface of the half-silvered mirror 2C, which was then inclined to the floor by 90 degrees (vertically) for 10 seconds. After drive voltages were applied at different frequencies to the half-silvered mirror 2C while it was inclined for 10 seconds again, the surface described above was photographed under the optical microscope (lower portion in FIG. 8). Frequencies of 100, 1000, 5000, and 10000 Hz were selected as the frequency of the drive voltage to be supplied from the power source 6 to the half-silvered mirror 2C.

As shown in the graph in FIG. 9, the dust removal rate reaches a maximum at 1000 Hz and abruptly decreases at 10000 Hz. It is believed from this result that the dust removal method using the optical device according to the embodiment of the invention is very effective and that the frequency of the drive voltage applied to perform the dust removal is desirably set at a value lower than or equal to 5000 Hz.

[Experiment 2]

Figure 10:
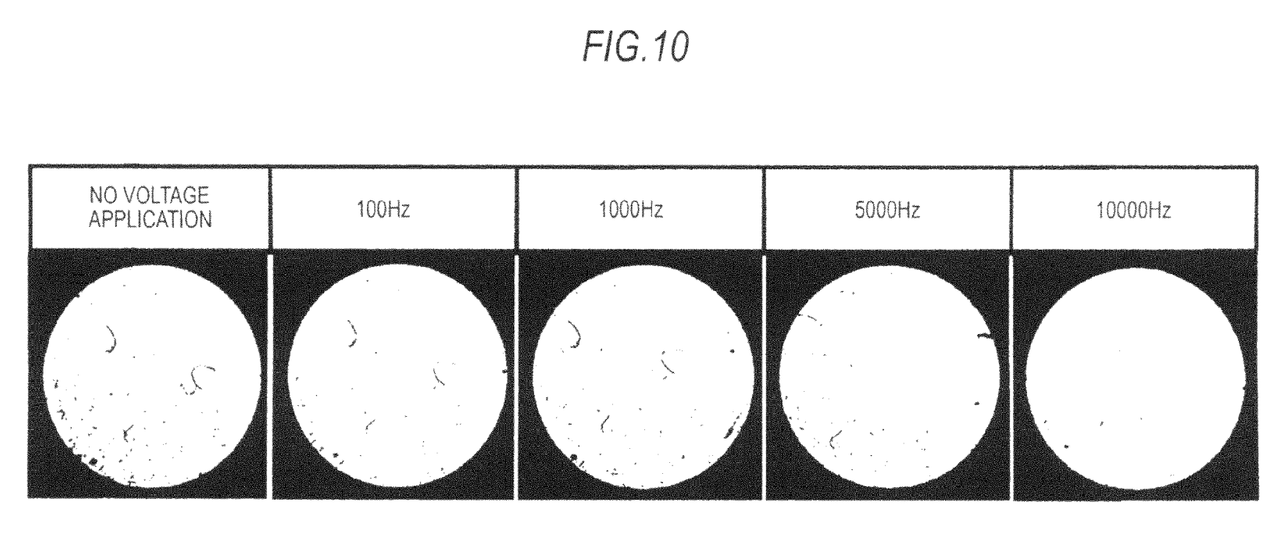
FIG. 10 is a top view of the half-silvered mirror and shows the surface thereof after dust proofing treatment.

In Experiment 2, the same treatment and photographing as those in Experiment 1 were carried out by using the half-silvered mirror 2C used in Experiment 1 but replacing the solder balls, which were dust, with cotton dust. FIG. 10 shows how much the surface of the half-silvered mirror 2C is contaminated when cotton dust having adhered to the surface of the half-silvered mirror underwent the dust removal.

The result shows that there is no great difference between the state of the dust where no voltage was applied and the state of the dust where a drive voltage having a frequency of 1000 Hz was applied. When a drive voltage having a frequency of 5000 Hz was applied, however, the amount of dust started decreasing, and when a drive voltage having a frequency of 10000 Hz or higher was applied, almost all the dust was removed. It is believed from the result that a drive voltage having a relatively high frequency higher than or equal to 5000 Hz is effective in removing dust having a low specific gravity, such as cotton dust, and that a drive voltage having a frequency higher than or equal to 10000 Hz, in particular, is most effective.

From the results described above, a drive voltage having a low frequency lower than or equal to 5000 Hz is effective in removing dust having a relatively high specific gravity, such as solder balls and sands, whereas a drive voltage having a high frequency higher than or equal to 5000 Hz is effective in removing dust having a relatively low specific gravity, such as cotton and fiber dust. It is therefore effective to use not only a drive voltage having a frequency in a low frequency range but also a drive voltage having a frequency in a high frequency range in order to effectively remove dust having adhered to a half-silvered mirror or any other optical device. Alternatively, when the type of dust can be identified to some extent, the frequency of the drive voltage to be applied may be selectively switched.

According to the first embodiment of the invention described above, a half-silvered mirror having a dust removal capability can be achieved by forming a base of the half-silvered mirror with a ferroelectric film, disposing a transparent electrode on both sides of the ferroelectric film, and layering the resultant structure on a half-silvered mirror body without increase in the outer dimension (peripheral dimension, in particular) of the half-silvered mirror.

2. <Second Embodiment>

A second embodiment will next be described with reference to a case where an optical device to which the invention is applied is a lens.

Figure 11:
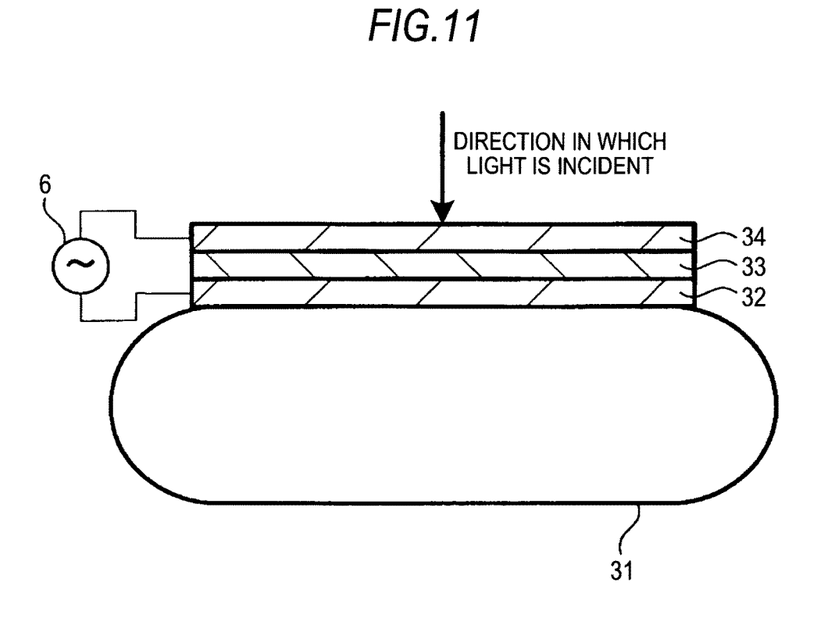
FIG. 11 is a cross-sectional view showing the configuration of a lens according to a second embodiment of the invention.

FIG. 11 shows an example of the configuration of a lens according to the second embodiment.

The lens according to the present embodiment includes a lens body 31, such as a plano-convex lens. A transparent electrode 32, such as an ITO film, is deposited on one surface of the lens body 31. A ferroelectric film 33, such as a PVDF film or a PZT film, is then deposited on the transparent electrode 32. A transparent electrode 34, such as an ITO film, is then overlaid on the ferroelectric film 33.

Since the transparent electrodes 32 and 34 should transmit light incident on the lens, each of the transparent electrodes 32 and 34 is desirably as thin and transparent as possible. The layered structure, in which the ferroelectric film 33 sandwiched between the transparent electrodes 32 and 34 having the properties described above is overlaid on the lens, allows dust having adhered to the lens to be removed by applying a drive voltage from the power source 6 to the transparent electrodes 32 and 34 without very little decrease in light transmittance of the lens.

The present embodiment has been described with reference to the case where the lens body 31 is a plano-convex lens. The invention is also applicable to other lenses, such as a biconvex lens, an aspheric lens, a cylindrical lens.

According to the second embodiment of the invention, a lens having a dust removal capability can be achieved by disposing a transparent electrode on both sides of a ferroelectric film and overlaying the resultant structure on a lens body without increase in the outer dimension (peripheral dimension, in particular) of the lens, as in the first embodiment.

3. <Third Embodiment>

A third embodiment will next be described with reference to a case where an optical device to which the invention is applied is a metal mirror.

Figure 12:
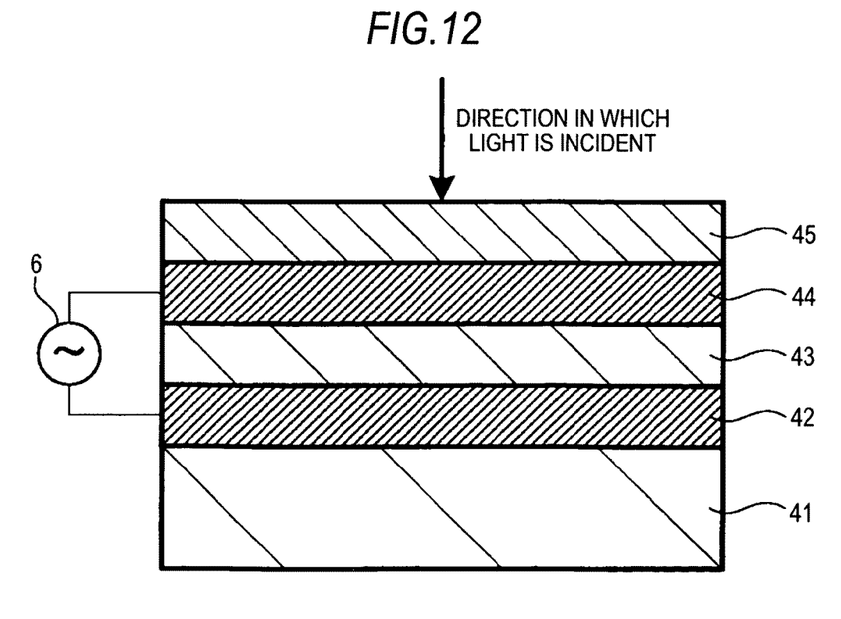
FIG. 12 is a cross-sectional view showing the configuration of a mirror according to a third embodiment of the invention.

FIG. 12 shows an example of the configuration of a metal mirror according to the third embodiment.

The metal mirror according to the present embodiment includes a base 41 (such as synthetic quartz). A transparent electrode 42, such as an ITO film, is deposited on the base 41. A ferroelectric film 43, such as a PVDF film or a PZT film, is then deposited on the transparent electrode 42. A transparent electrode 44, such as an ITO film, is then overlaid on the ferroelectric film 43. A metal mirror body (metal film) 45 is finally deposited on the transparent electrode 44.

When the invention is applied to a metal mirror, no transparency is required. The electrode is therefore not necessarily transparent or made, for example, of ITO but only needs to have low resistance. The electrode can therefore be made of Al, Cu, AlSiCu, or any other suitable metal. Further, an electrode is provided on both sides of the ferroelectric film 43 in order to apply a voltage from the power source 6 across the ferroelectric film 43 according to the invention, but the function of a transparent electrode can be imparted to the metal mirror body 45 itself in the case of a metal mirror. Moreover, an optical device to which the invention is applied is a metal mirror in the present embodiment, and the invention is also applicable, for example, to a dielectric mirror having the same configuration.

According to the third embodiment of the invention, a metal mirror having a dust removal capability can be achieved by disposing a transparent electrode on both sides of a ferroelectric film and overlaying the resultant structure on a metal mirror body without increase in the outer dimension (peripheral dimension, in particular) of the metal mirror, as in the first embodiment.

4. <Fourth Embodiment>

A fourth embodiment will next be described with reference to a case where an optical device to which the invention is applied is a polarization device.

Figure 13:
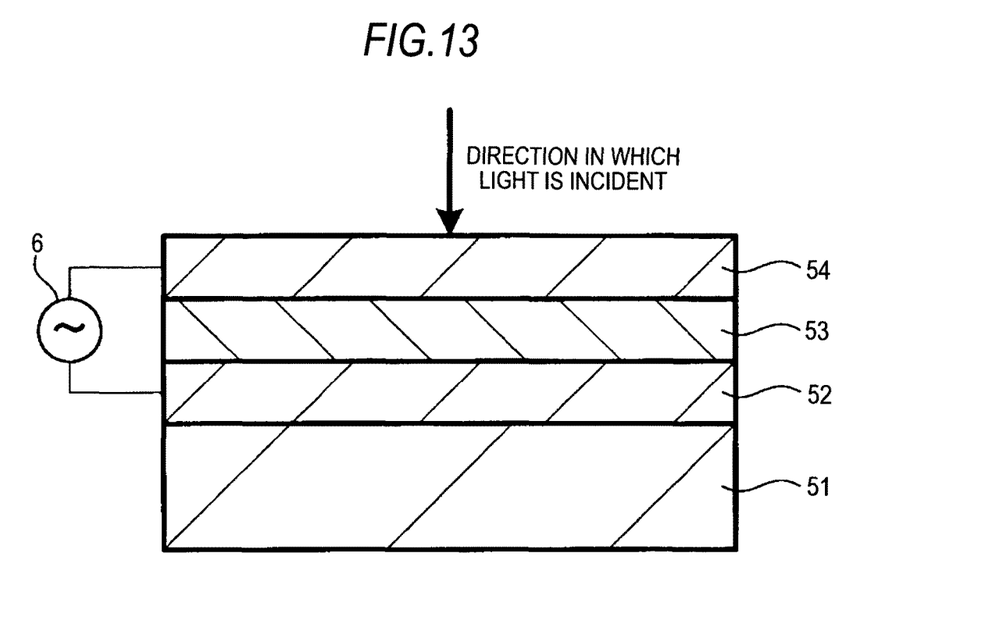
FIG. 13 is a cross-sectional view showing the configuration of a polarization device according to a fourth embodiment of the invention.

FIG. 13 shows an example of the configuration of a polarization device according to the fourth embodiment.

The polarization device according to the present embodiment includes a polarization device body 51. A transparent electrode 52, such as an ITO film, is deposited on the polarization device body 51. A ferroelectric film 53, such as a PVDF film or a PZT film, is then deposited on the transparent electrode 52. A transparent electrode 54, such as an ITO film, is then overlaid on the ferroelectric film 53.

In the present embodiment, light incident on the polarization device desirably comes from the side where the transparent electrode 54 is present. The reason for this is that when the ferroelectric film 53 provides birefringence even when no voltage is applied, the polarization device can work as a typical polarization device when the ferroelectric film 53 is disposed upstream of the polarization device body 51. When a ferroelectric film to be used provides birefringence only when a voltage is applied, the direction in which light is incident on the polarization device can be arbitrary determined.

According to the fourth embodiment of the invention, a polarization device having a dust removal capability can be achieved by disposing a transparent electrode on both sides of a ferroelectric film and overlaying the resultant structure on a polarization device body without increase in the outer dimension (peripheral dimension, in particular) of the polarization device, as in the first embodiment.

5. <Fifth Embodiment>

A fifth embodiment will next be described with reference to a case where an optical device to which the invention is applied is an optical filter.

Figure 14:
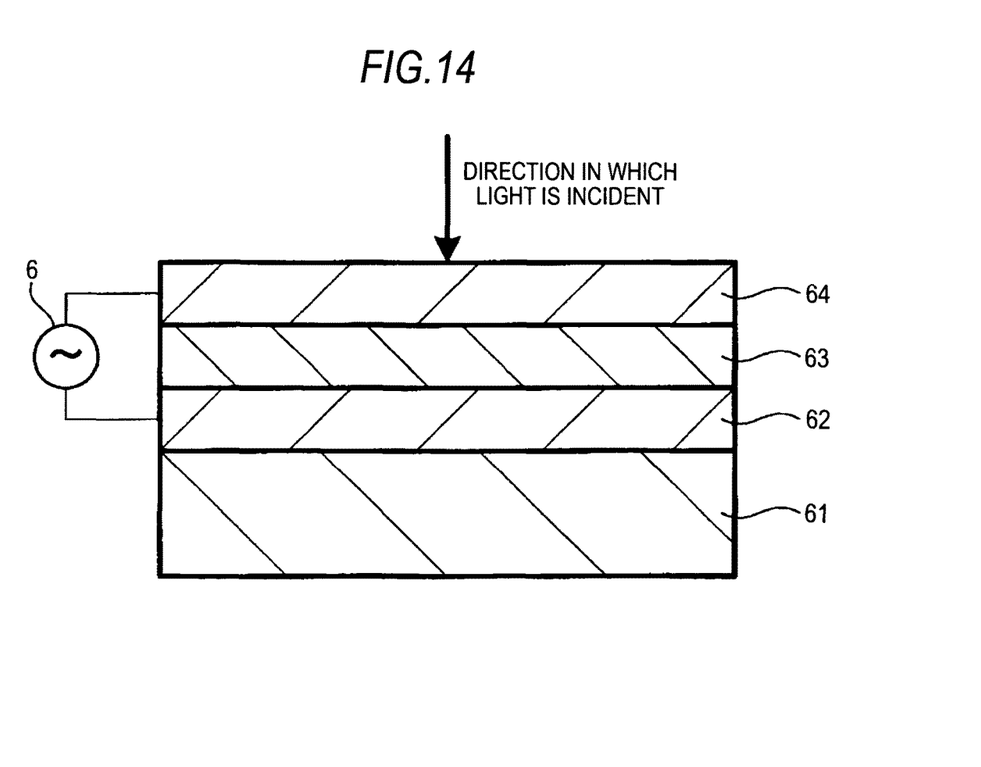
FIG. 14 is a cross-sectional view showing the configuration of an optical filer according to a fifth embodiment of the invention.

FIG. 14 shows an example of the configuration of an optical filter according to the fifth embodiment.

The optical filter according to the present embodiment includes an optical filter body 61. A transparent electrode 62, such as an ITO film, is deposited on the optical filter body 61. A ferroelectric film 63, such as a PVDF film or a PZT film, is then deposited on the transparent electrode 62. A transparent electrode 64, such as an ITO film, is then overlaid on the ferroelectric film 63.

In the present embodiment, light incident on the optical filter comes from the side where the transparent electrode 64 is present, but the direction in which light is incident may be arbitrarily determined. In the case of an optical filter, however, unlike a polarization device, changing the direction in which light is incident causes not only the intensity of light having passed through the optical filter to decrease but also desired optical characteristics themselves to change. It is therefore necessary to perform optical design in consideration of the transparent electrodes and the ferroelectric film in advance. The invention can be applied to an interference filter, an IR (infrared) filter, an ND (Neutral Density) filter, and other optical filters by performing optical design as described above.

According to the fifth embodiment of the invention, an optical filter having a dust removal capability can be achieved by disposing a transparent electrode on both sides of a ferroelectric film and overlaying the resultant structure on an optical filter body without increase in the outer dimension (peripheral dimension, in particular) of the optical filter, as in the first embodiment.

The invention has been described with reference to the embodiments thereof but is not limited thereto. Other variations and applications, of course, fall within the scope of the invention to the extent that they do not depart from the substance of the invention set forth in the claims.

For example, the first embodiment has been described with reference to an imaging apparatus as an example of an optical apparatus using an optical device to which the invention is applied, but the optical apparatus using the optical device may be any other optical apparatus having an optical system. The invention is also applicable to a microscope, a telescope (binoculars), a laser apparatus, and any other variety of optical apparatus.

The present application contains subject matter related to that disclosed in Japanese Priority Patent Application JP 2010-039297 filed in the Japan Patent Office on Feb. 24, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A vibration apparatus adapted to cause an optical device to vibrate, the optical device having a first surface and a second surface disposed opposite the first surface, the vibration apparatus comprising:
   a vibration device including:
      a first transparent electrode film;
      a second transparent electrode film; and
      a first ferroelectric film disposed between the first and second transparent electrode films and in facial contact with at least one of the first and second transparent electrode films,
   wherein the vibration device is arranged on and in facial contact with at least one of the first and second surfaces of the optical device and, upon applying a driving voltage to the first and second transparent electrode films, the first ferroelectric film vibrates thereby causing the optical device to vibrate.

2. The vibration apparatus according to claim 1,
   wherein the first ferroelectric film and the optical device are formed between the first and second transparent electrode films.

3. The vibration apparatus according to claim 2,
   wherein a third transparent electrode film is formed between the first and second transparent electrode films, the first ferroelectric film is formed between the first and third transparent electrode films, and
   a second ferroelectric film is formed between the second and third transparent electrode films.

4. The vibration apparatus according to claim 2,
   wherein a transparent, flexible base is formed on a surface of the second transparent electrode film.

5. The vibration apparatus according to claim 1,
   wherein the optical device in facial contact with a surface of the second transparent electrode film.

6. The vibration apparatus according to claim 1,
   wherein the optical device is selected from a group consisting of a half-silvered mirror, a lens, a mirror, a polarization device and an optical filter.

7. An optical vibration apparatus comprising:
   an optical device having a first surface and a second surface disposed opposite the first surface; and
   a vibration device including:
      a first transparent electrode film;
      a second transparent electrode film; and
      a first ferroelectric film deposited between and in facial contact with at least one of the first and second transparent electrode films; and
   a power source that generates a drive voltage,
   wherein the vibration device is arranged on and in facial contact with at least one of the first and second surfaces of the optical device and, upon applying the driving voltage to the first and second transparent electrode films, the first ferroelectric film vibrates thereby causing the optical device to vibrate.

8. The optical vibration apparatus according to claim 7,
   wherein the drive voltage generated by the power source has a frequency of 5000 Hz or lower when dust having adhered to a surface of the first transparent electrode film has a large specific gravity, whereas the drive voltage generated by the power source has a frequency of 5000 Hz or higher when dust having adhered to the surface of the first transparent electrode film has a small specific gravity.

9. The optical vibration apparatus according to claim 7,
   wherein the optical device is selected from a group consisting of a half-silvered mirror, a lens, a mirror, a polarization device and an optical filter.

10. An optical vibration apparatus comprising:
   an optical device having a first surface and a second surface disposed opposite the first surface;
   a first transparent electrode film deposited on the first surface of the optical device;
   a ferroelectric film having a first ferroelectric surface and a second ferroelectric surface disposed opposite the first ferroelectric surface, the ferroelectric film deposited on the second surface of the optical device with the first ferroelectric surface of the ferroelectric film and the second surface of the optical device in facial contact with each other; and
   a second transparent electrode film deposited on the second ferroelectric surface of the ferroelectric film,
   wherein, upon applying a driving voltage to the first and second transparent electrode films, the ferroelectric film vibrates thereby causing the optical device to vibrate.

* * * * *